United States Patent
Doshi et al.

(10) Patent No.: US 7,620,273 B2
(45) Date of Patent: Nov. 17, 2009

(54) METHODS AND DEVICES FOR PROVIDING OPTICAL, SERVICED-ENABLED CROSS-CONNECTIONS

(75) Inventors: Bharat Tarachand Doshi, Holmdel, NJ (US); Stefan Hunsche, Jersey City, NJ (US); Ramesh Nagarajan, Somerset, NJ (US); Srinivasa Prasanna, Bridgewater, NJ (US); Narayan Raman, Eatontown, NJ (US); Meenakshi Sharma, Parlin, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 422 days.

(21) Appl. No.: 10/073,931

(22) Filed: Feb. 14, 2002

(65) Prior Publication Data

US 2002/0131153 A1 Sep. 19, 2002

Related U.S. Application Data

(60) Provisional application No. 60/276,443, filed on Mar. 16, 2001.

(51) Int. Cl.
*G02B 6/26* (2006.01)
*H04J 14/00* (2006.01)

(52) U.S. Cl. .............. 385/16; 398/45; 398/49; 398/50; 398/56; 398/147; 398/175; 398/177; 398/25; 398/48; 370/360; 370/431; 359/334

(58) Field of Classification Search ............ 398/81, 398/45, 48–50, 56, 92, 147, 149, 157, 175, 398/177, 25; 370/359, 360, 431; 359/334; 385/16

See application file for complete search history.

(56) References Cited

U.S. PATENT DOCUMENTS 5,726,788 A * 3/1998 Fee et al. .................... 398/180
6,331,906 B1 * 12/2001 Sharma et al. ............... 398/48
6,624,927 B1 * 9/2003 Wong et al. ................ 359/334

FOREIGN PATENT DOCUMENTS

| EP | 0 473 331 A2 | 3/1992 |
| EP | 1 009 119 A2 | 6/2000 |
| GB | 2 346 280 A | 8/2000 |
| WO | WO 98/47039 | 10/1998 |

OTHER PUBLICATIONS

Parys, Wim Van; Arijs, Peter; and Antonis, Olivier Quantifying the benefits of Selective Wavelength Regeneration in ultra long-haul WDM networks; Optical Society of America paper TuT4-1, OFC 2000.

Parys, Wim Van; Arjs, Peter; Evolution Towards Transparent Optical Networks Using Selective Wavelength Regeneration and Conversion; NFOEC 2000.

Lehr, G. et al., "Management of All-Optical WDM Networks, First Results of European Research Project Moon", 1998 IEEE Network Operations and Management Syposium, Feb. 15-20, 1998, vol. 3, pp. 870-879.

* cited by examiner

*Primary Examiner*—Evelyn A. Lester
(74) *Attorney, Agent, or Firm*—The Capitol Patent & Trademark Law Firm, PLLC

(57) ABSTRACT

A technique for improving optical cross-connections comprises placing a switch in front of a number of processing units. So configured, the units are no longer dedicated to a specific link or signal. When necessary, a unit is connected/disconnected to one or more optical links by the switch to carry out any number of processing functions, such as regeneration, Raman pumping, dispersion equalization/compensation or performance monitoring. Because the units are no longer dedicated to specific links the cost of the cross-connections and the network it is a part of can be reduced.

3 Claims, 1 Drawing Sheet

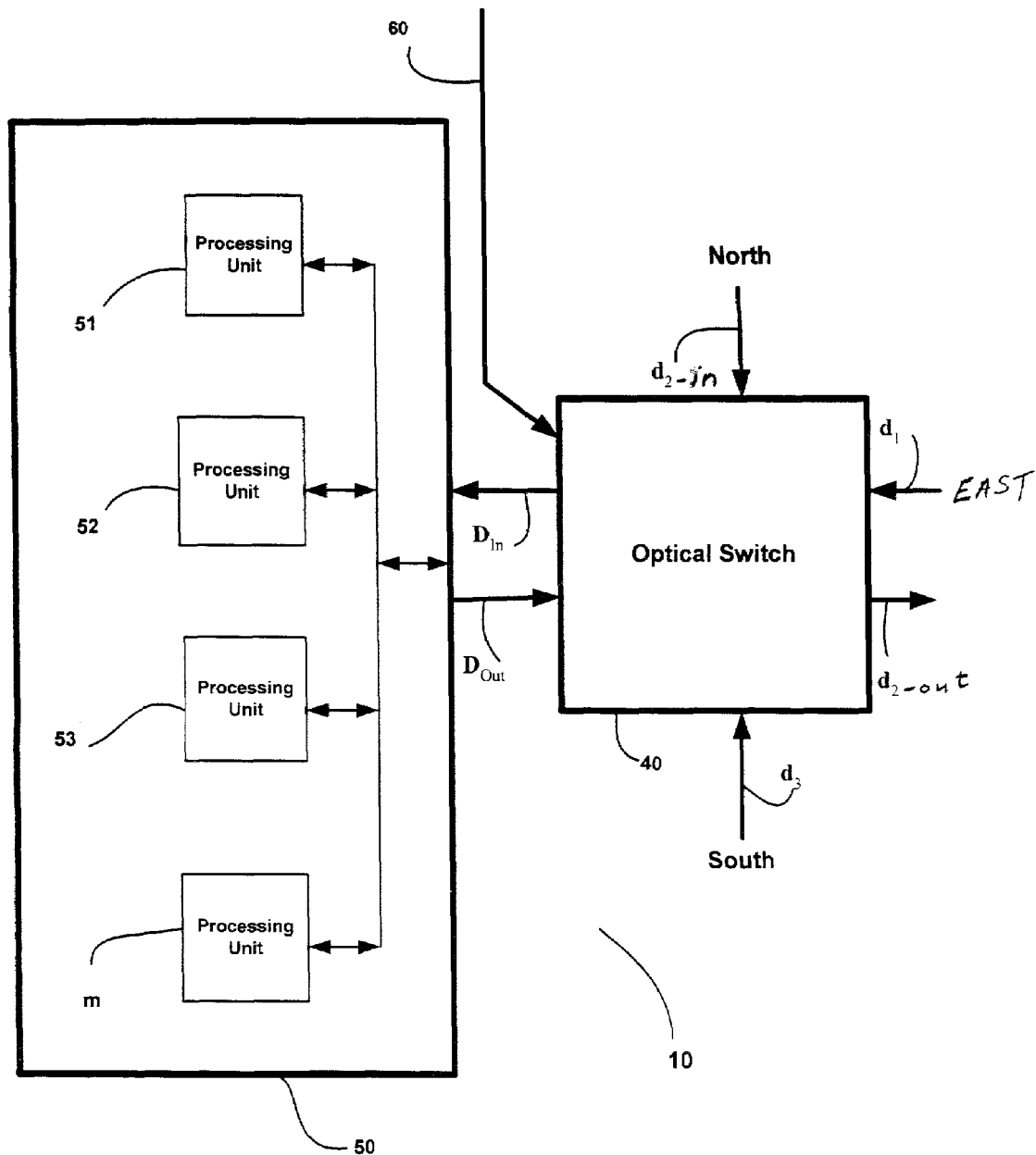

METHODS AND DEVICES FOR PROVIDING OPTICAL, SERVICED-ENABLED CROSS-CONNECTIONS

The present application claims the benefit of priority of co-pending U.S. provisional patent application No. 60/276,443 filed Mar. 16, 2001, the disclosure of which is hereby incorporated by reference.

BACKGROUND OF THE INVENTION

Today, when voice, data or video communication signals are transmitted from one location to another the chances are high that such communications will be sent via an optical fiber network. So-called "ultra, long-reach" ("ULR") optical fiber networks are in the planning stages or just being built. ULR networks are characterized by their ability to transmit signals extremely long distances without the need to process the signals other than simple amplification.

The advantages offered by ULR networks are many. First, signals within links of a ULR network can go extremely long distances without being processed. The fewer times a signal needs to be processed, the less expensive the link will be when built and operated.

Because processing is not needed to be done as often, it is possible to process signals from multiple links using the same processing equipment.

Unfortunately, the advantages offered by ULR networks have not been realized because the design of so-called electronic "cross-connection" equipment has not evolved to take these advantages into consideration. For example, existing electronic cross-connection designs still require that an individual processing unit (e.g., an optical-to-electrical-to-optical ("OEO") regenerator) be dedicated to each wavelength within a link. This is a potential waste of resources because signals within a ULR link may not need to be processed at all at any given "node."

Utilizing existing electronic cross-connection equipment to process signals from ULR links has other inherent drawbacks. When OEOs are used, it means the optical network is not "transparent". That is, the transmitters and receivers used in such a network must be capable of sending and receiving signals compatible with one or more specific electrical/electronic-based "protocols". Only signals formatted to fit such protocols will "pass through" the network. In contrast, when OEOs are not used the network remains transparent; capable of passing any number of optical signals regardless, for the most part, of the protocol or bit rate used.

It follows, then, that it makes little sense to utilize existing cross-connection designs to process signals from a ULR link when such processing is not needed and when such processing converts a transparent ULR link into a non-transparent link.

Accordingly, it is a desire of the present invention to provide for methods and devices for improving optical cross-connections and nodes.

It is also a desire of the present invention to provide for methods and devices that reduces the cost of ULR networks.

It is yet a further desire of the present invention to provide for methods and devices that increases the transparency of ULR networks.

Further desires will be apparent from the drawings, detailed description of the invention and claims which follow.

SUMMARY OF THE INVENTION

In accordance with the present invention methods and devices for improving cross-connections include an optical connection device comprising one or more optical processing units and an optical switch adapted to connect at least one of the units to one or more optical signals based on a characteristic of each signal. Only when the characteristics of the signal indicate that processing is needed is a processing unit connected to the signal. As such, units are no longer dedicated to each signal. This reduces the cost of the overall network, among other things.

The processing unit may comprise a regenerator, Raman pump, dispersion equalization/compensation unit or a performance monitor of some sort.

BRIEF DESCRIPTION OF THE DRAWINGS

FIG. 1 shows a technique which may be used to improve optical cross-connections according to one example or embodiment of the present invention.

DETAILED DESCRIPTION OF THE INVENTION

The present invention can best be described by referring to a number of examples which follow. While these examples will illustrate the features of the present invention, they in no way are intended to limit the scope of the present invention.

One example, or embodiment, of the present invention is shown in FIG. 1.

As shown, an optical, service-enabled connection unit 10 is adapted to dynamically process one or more optical signals from one or more links $d_1$, $d_{2-in}$, or $d_3$ based on a characteristic of each signal within links $d_1$, $d_{2-in}$, or $d_3$. It should be understood that by "signal" is meant either a signal comprising a single wavelength or one comprising multiple wavelengths, multiple signals.

As will be recognized by those skilled in the art, connection units, such as connection unit 10 envisioned by the present invention, may act as an "optical layer service node" capable of performing a wide variety of services and/or functions. Such a node is capable of providing any number of processing features, such as signal regeneration, Raman pumping, wavelength conversion, signal characteristic processing and performance monitoring (i.e., during the set-up phase of a link, etc . . . determining if signal processing is needed, e.g., bit error rate testing, etc . . . ) to name a few examples. Connection unit 10 is shown comprising a switch 40 and a plurality of processing units 51-$m$, where "m" is the last unit. Taken together the processing units 51-$m$ may be referred to as a "bank" 50 of processing units. When located at a cross-connection point the unit 10 may be referred to as a "cross-connection device" though it should be understood that units, like unit 10, envisioned by the present invention may be used at any node along a link as well. As envisioned by the present invention the optical switch 40 is adapted to dynamically connect and/or disconnect one or more of the processing units 51-$m$ to one or more optical signals within links $d_1$, $d_{2-in}$, and/or $d_3$. For ease of understanding, the inputs and outputs corresponding with signal $d_2$ have been labeled $d_{2-in}$ and $d_{2-out}$.

For purposes of this example, it will be assumed that all three links approach the optical switch 40 from different directions; link $d_1$ from the east, $d_{2-in}$ from the north, and $d_3$ from the south.

Though shown as two separate units in FIG. 1, it should be understood that the optical switch 40 and bank 50 may be combined into a single unit or further broken down into additional units.

As stated before the optical switch 40 is adapted to connect or disconnect one or more of the processing units 51-$m$ to one or more of the optical signals within links $d_1$, $d_{2\text{-}in}$, and/or $d_3$ based on characteristics of each signal. Sometimes one unit 51-$m$ may be connected to a single link and/or sometimes one unit 51-$m$ may be connected to more than one link/signal at a time. Whatever the case, none of the units 51-$m$ are solely dedicated to one link.

The characteristics of a signal may be measured or otherwise detected by the switch 40 or, more commonly, they may be measured by other network equipment. In the latter case, once the characteristics are measured, a centralized or partially distributed network management system (not shown in FIG. 1) is adapted to send instructions or the like to switch 40 via pathway 60.

In an illustrative embodiment of the present invention, an optical signal within links $d_1$, $d_{2\text{-}in}$ or $d_3$ will only be processed (i.e., connected to a processing unit 51-$m$) if the optical switch 40 receives an instruction via pathway 60 to do so. In this way, if any signal is a part of a link from within a ULR network it will not be connected (or disconnected) via switch 40 to a processing unit 51-$m$ unless the ULR network sends an instruction to the optical switch 40 via pathway 60. This avoids the needless connection of an optical signal to one or more processing units 51-$m$.

In one embodiment of the present invention, one or more of the signal processing units 51-$m$ may comprise a regenerator (e.g., OEO) adapted to regenerate or "boost" the optical signal-to-noise ratio ("SNR") of signals within links $d_1$, $d_{2\text{-}in}$, or $d_3$. Thus, if the optical SNR of a signal needs to be increased, the optical switch 40 is adapted to connect and/or disconnect a processing unit 51-$m$ to the signal In this way, even though none of the units 51-$m$ are dedicated to a single signal, the optical SNR of a signal may nonetheless be increased. In one embodiment of the present invention, this connection/disconnection is done electronically, not manually, making it a lot easier for those monitoring/maintaining such a link to connect/disconnect processing units.

In a further embodiment of the present invention, one of the optical signals may be a signal which is in need of wavelength conversion. For example, the optical switch 40 may alternatively connect and disconnect a signal $d_{2\text{-}in}$ to one or more processing units 51-$m$ via pathway $D_{IN}$. In turn, one or more of the processing units 51-$m$ may be adapted to change the wavelength of signal $d_{2\text{-}in}$ and output such a converted signal to switch 40 or another port (not shown) via pathway $D_{OUT}$.

In yet additional embodiments of the present invention, one or more of the processing units 51-$m$ may comprise a Raman pump adapted to amplify all signals within an optical link $d_1$, $d_{2\text{-}in}$, or $d_3$ connected to switch 40.

It should be understood that processing units 51-$m$ may all be the same type or may comprise any number of different types of processing units. It should be further understood that the type of processing unit 51-$m$ which is connected or disconnected by switch 40 to a given link depends on the type of characteristic needing adjustment. For example, processing units' 51-$m$ may comprise all OEOs or a combination of Raman pumps and OEOs. In addition, the processing units 51-$m$ may comprise other types of processing elements such as: optical-to-optical-to-optical ("OOO") dispersion equalization/compensation units, gigabit Ethernet units, SDL units, SONET/SDH units, 2R (re-shape and re-amplify without retiming) units, 3R (re-shape and re-amplify and retime) units, to name just a few examples. In the case where the optical switch 40 connects an OOO to a link $d_1$, $d_{2\text{-}in}$, or $d_3$, or where the unit 10 determines that no OEO is needed, the transparency of such a signal/link is maintained because no optical-to-electrical conversions occur.

It should be understood that the number of optical links input into switch 40 is typically more than three and typically numbers in the hundreds or thousands. Again, though this is so it should be understood that unlike conventional systems, none of the processing units 51-$m$ needs to be dedicated to a single signal or link. Therefore, the number of processing units 51-$m$ can be substantially reduced. This reduction in processing units helps reduce the costs of the connection unit 10 and any network it is a part of.

Though not shown in FIG. 1, those skilled in the art will realize that, depending on the type of processing unit 51-$m$ making up bank 50, multiplexing and/or demultiplexing of the signals within links $d_1$, $d_{2\text{-}in}$, and $d_3$ may be necessary. In general, when units 51-$m$ comprise regenerators multiplexing/demultiplexing will be required to insure a single wavelength at a time is eventually sent by switch 40 to bank 50. This may be accomplished before signals from links $d_1$, $d_{2\text{-}in}$, or $d_3$ are input into the switch 40 (e.g., by a separate device/unit) or may be done by the switch itself.

In contrast, when the units 51-$m$ comprise Raman pumps or dispersion/compensation units no multiplexing/demultiplexing is needed. In effect, these types of units are capable of handling multiple signals of differing wavelengths from each link $d_1$, $d_{2\text{-}in}$, and $d_3$. It can be said that those units operate "fiber by fiber" while regenerators work "wavelength by wavelength".

The connection unit 10 may alternatively be made a part of a "router", such as those made by Lucent Technologies, Inc.

In the claims which follow it should be understood that by "connect" is meant the connection and/or disconnection of one or more of the units 51-$m$ to one or more optical signals or links via switch 40.

The above discussion has given only a few examples of the present invention. Others are possible within the spirit and scope of the present invention, defined by the claims which follow:

The invention claimed is:

1. A connection device comprising:
one or more non-dedicated, processing units; and
an optical switch for receiving Ultra-Long Haul (ULR) optical signals and for connecting at least one of the units to one or more of the received signals based on a characteristic of each signal,
wherein the at least one unit is selected from the group consisting of a gigabit Ethernet unit, a re-shape and re-amplify without retiming unit ("2R unit"), a re-shape and re-amplify with retiming unit ("3R unit"), a Simple Data Link (SDL) unit and a SONET/SDH unit.

2. A router comprising:
one or more non-dedicated, processing units; and
an optical switch for receiving Ultra-Long Haul (ULR) optical signals and for connecting at least one of the units to one or more of the received signals based on a characteristic of each signal,
wherein the at least one unit is selected from the group consisting of a gigabit Ethernet unit, a 2R unit, a 3R unit, a SDL unit and a SONET/SDH unit.

3. A method for providing an optical, service-enabled connection comprising:
receiving Ultra-Long Haul (ULR) optical signals; and
connecting at least one of a number of non-dedicated, processing units to one or more of the received optical signals based on a characteristic of each signal,
wherein the at least one unit is selected from the group consisting of a gigabit Ethernet unit, a 2R unit, a 3R unit, a SDL unit and a SONET/SDH unit.

* * * * *

UNITED STATES PATENT AND TRADEMARK OFFICE
CERTIFICATE OF CORRECTION

PATENT NO. : 7,620,273 B2
APPLICATION NO. : 10/073931
DATED : November 17, 2009
INVENTOR(S) : Doshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Fourteenth Day of December, 2010

David J. Kappos
*Director of the United States Patent and Trademark Office*